United States Patent [19]

Itsuki et al.

[11] Patent Number: 4,638,154

[45] Date of Patent: Jan. 20, 1987

[54] REFLECTION-TYPE PHOTOELECTRIC SWITCHING APPARATUS WITH LIGHT-ADJUSTABLE REFERENCE LIGHT DETECTION

[75] Inventors: Fumiaki Itsuki, Nagaokakyo; Seiji Oku, Osaka, both of Japan

[73] Assignee: Omron Tateisi Electronics Co., Kyoto, Japan

[21] Appl. No.: 563,642

[22] Filed: Dec. 20, 1983

Related U.S. Application Data

[63] Continuation of Ser. No. 238,703, Feb. 27, 1981, abandoned.

[30] Foreign Application Priority Data

Mar. 15, 1980 [JP] Japan .................................. 55-32878

[51] Int. Cl.⁴ .............................................. H01J 5/16
[52] U.S. Cl. ..................................... 250/227; 250/239
[58] Field of Search ............. 250/227, 229, 216, 239, 250/221, 222.1, 208, 209; 350/96.1

[56] References Cited

U.S. PATENT DOCUMENTS

| | | | |
|---|---|---|---|
| 3,758,784 | 9/1973 | Vischulis | 250/227 |
| 3,881,825 | 5/1975 | Chisholm | 250/227 |
| 3,986,777 | 10/1976 | Roll | 250/227 |

*Primary Examiner*—David C. Nelms
*Attorney, Agent, or Firm*—Schwartz, Jeffery, Schwaab, Mack, Blumenthal & Evans

[57] ABSTRACT

A reflection-type photoelectric switching apparatus comprising a lamp for projecting light rays to an object, a photoelectric element for receiving reflected light rays from the object, a reference photoelectric element mounted on a board in side-by-side relation with the photoelectric element, a light conducting means for guiding a part of said light rays from the lamp to the reference photoelectric element, and an adjusting means for adjusting the quantity of light rays guided by the light conducting means to be balanced with that of the reflected light rays received by the photoelectric element.

6 Claims, 4 Drawing Figures

REFLECTION-TYPE PHOTOELECTRIC SWITCHING APPARATUS WITH LIGHT-ADJUSTABLE REFERENCE LIGHT DETECTION

This is a continuation of application Ser. No. 238,703, filed Feb. 27, 1981, now abandoned.

BACKGROUND OF THE INVENTION

This invention relates to a reflection-type photoelectric switching apparatus which includes a light projecting element for projecting a beam of light to an object, a light receiving element for receiving a reflected light beam from the object and a circuit unit for processing output signals generated from the light receiving element, and more particularly to an improved photoelectric switching apparatus capable of generating a steady switching output signal regardless of any change in the environment surrounding the light receiving element.

The conventional reflection-type photoelectric switching apparatus is essentially such that the presence of an object is detected by comparing a predetermined reference signal level with an output signal amplitude obtained from a light receiving element which receives reflected light rays from the object. The reference signal level can be determined by colors or reflectances of the object and matter adjacent to the object. When the application process is that of cutting a sheet of paper to a predetermined size, for instance, the reference level is determined in accordance with the color of the sheet and of markings, thus defining the predetermined size of the sheet detected by the switching apparatus.

Generally, an LED (light emitting diode) or an incandescent lamp is utilized as a light source for a light projecting element comprised in the switching apparatus. Such a light projecting element has a given wavelength characteristic, so that the reflected light incident upon the light receiving element also has a similar spectral wavelength characteristic. The distribution of energy emitted from the light projecting element is, however, apt to vary with aging. Moreover, a range of wavelengths in which the light receiving element is sensitive to the reflected light is liable to vary with a change of temperature applied to the light receiving element. Thus, the wavelength characteristic of the output signal amplitude obtained from the light receiving element is unstable, because it is liable to vary with changes in the environment surrounding the light receiving element.

OBJECTS AND SUMMARY OF THE INVENTION

It is, therefore, a primary object of this invention to provide a photoelectric switching apparatus comprising a means for offsetting the changes on aging of the wavelength characteristics of a light projecting element and a light receiving element.

It is a further object of this invention to provide a photoelectric switching apparatus capable of performing a stable switching operation effected by changes of temperature adjacent the light projecting and receiving elements.

Other objects as well as the numerous advantages of this invention will become apparent from the following detailed description and the accompanying drawings.

DETAILED DESCRIPTION

Figure 1:
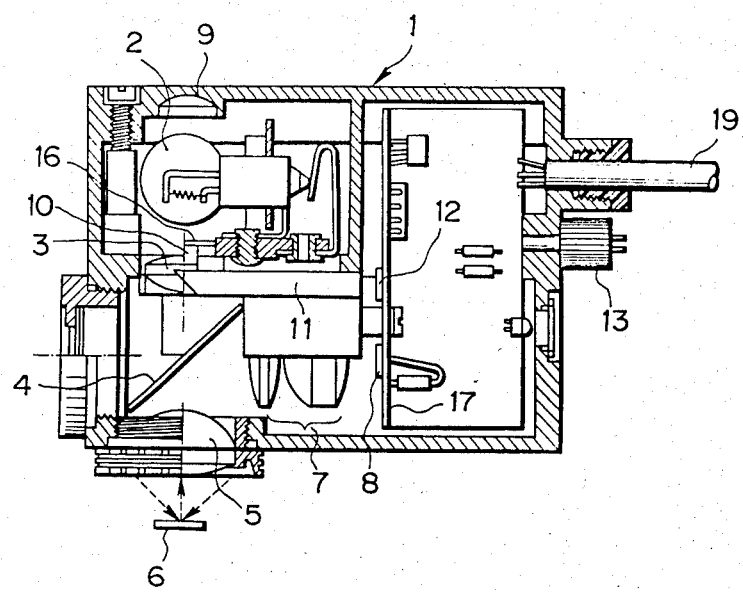
FIG. 1 is a partially exploded sectional side-elevation view of a reflection-type photoelectric switching apparatus of a preferred embodiment of this invention.

Referring, now, to FIG. 1, there is shown a reflection-type photoelectric switching apparatus, as one preferred embodiment of this invention, which is enclosed by an optically opaque housing 1. Light rays projected from an incandescent lamp 2 as a light source pass through a lens 3, a half-mirror 4 and an object lens 5 so as to be focused on an object 6 to be detected. The reflected light rays from the object 6 pass through the lens 5, are reflected by the half-mirror 4 and pass through a lens 7 so as to be applied to a light receiving photoelectric element 8 mounted on a printed circuit board 17. Thus, a light path for detection is provided between lamp 2 and element 8 via object 6. On the other hand, light rays projected from the lamp 2 are reflected and condensed by a concave mirror 9 so as to be guided by light conducting rods 10 and 11 to a reference light receiving photoelectric element 12 which is mounted on the board 17 near the element 8 in side-by-side relation. Thus, a reference light path is provided between lamp 2 and element 12 via rods 10 and 11.

Figure 2:
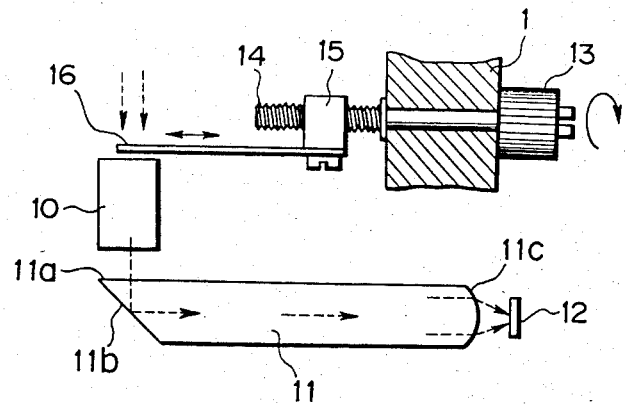
FIG. 2 is a schemative view illustrating a reference light conducting means for guiding reference light rays in the apparatus of FIG. 1.

As illustrated in detail in FIG. 2, the condensed light rays from the mirror 9 (shown in broken lines) enter the light conducting rod 10, e.g. made of transparent plastics, for further incidence on a flat top surface 11a of the light conducting rod 11. The light rays incident on the rod 11 are reflected in a manner of total reflection by an inclined surface 11b, and the reflected light rays are focused on the element 12 by the opposite surface 11c which forms a convex lens.

Above the rod 10, there is disposed a shading plate 16 which is adapted to be moved horizontally by an adjusting knob 13. That is to say, the knob 13 is rotatably disposed on an external wall of the hosing 1 and fixed to a screw rod 14. A movable nut 15 is engaged with the rod 14 and supports the plate 16. Upon revolution of the knob 13, the nut 15 moves together with the plate 16 so as to close or open the reference ligth path from lamp 2 to rod 10, whereby the quantity of the reference light rays to the element 12 is adjusted.

Figure 3:
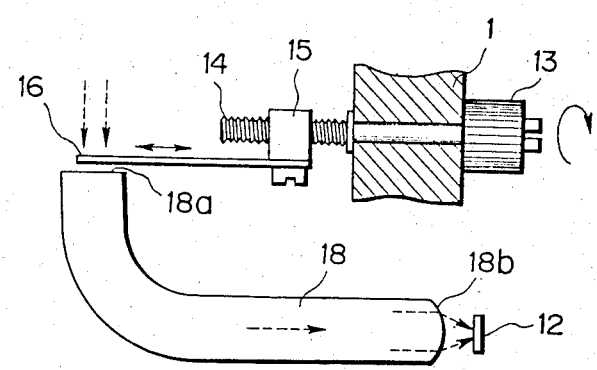
FIG. 3 is a schematic view illustrating a modification of the embodiment of FIG. 2.

In FIG. 3 there is shown a modified construction of the reference light path from the lamp 2 to the light receiving element 12. In this modification, there is employed an optical fiber 18. The fiber 18 is flexible, so that the light rays entering through a flat top surface 18a are guided to the element 12 without leaking outwardly from the fiber 18. A back end 18b of the fiber 18 forms a convex lens to focus the entered rays on the element 12. The incident light rays are scattered within the fiber 18 as they are reflected by an inner side wall thereof, whereby the light rays regulated by the plate 16 are uniformly guided to the end 18b and the adjustment of the quantity of light rays by the plate is improved.

Figure 4:
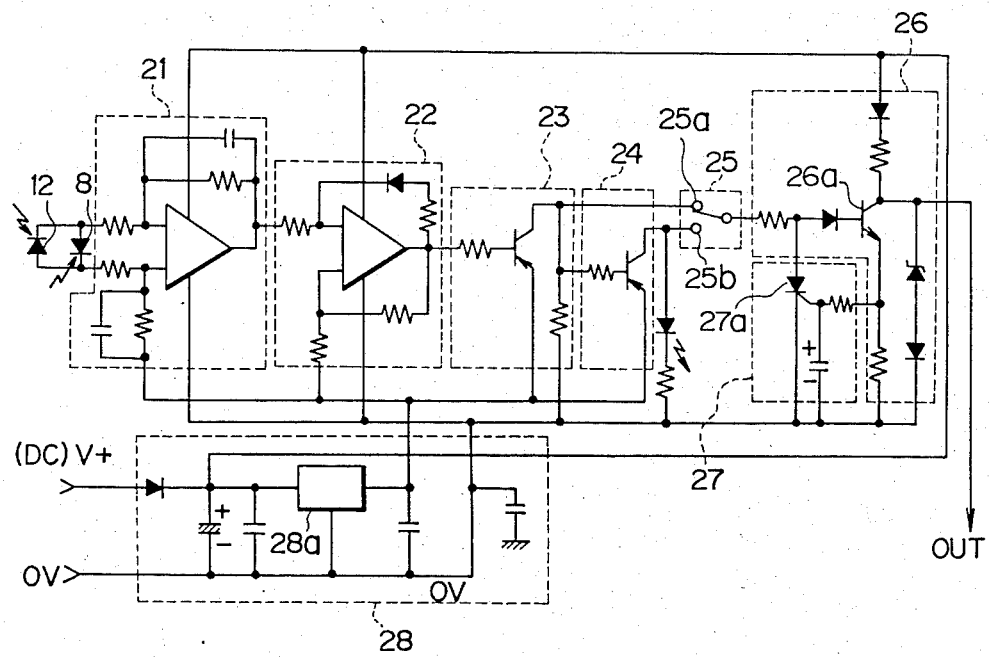
FIG. 4 is a circuit diagram employed in the apparatus of FIG. 1.

In FIG. 4, there is shown a switching circuit diagram of a circuit device which is assembled on the circuit board 17. The switching circuit substantially consists of an amplifying circuit unit 21 for receiving output signals from the light receiving elements 8 and 12, a Schmitt circuit unit 22 for rapidly changing its output states just when a slowly changing output voltage from the unit 21 reaches a predetermined critical level, a first inverting circuit unit 2 for inverting output signals from the unit 22, a second inverting circuit unit 24 for further inverting the inverted output signals from the unit 23, a switching unit 25 for selecting output signals from unit 23 or 24, an output circuit unit 26 for generating output signals outwardly from this switching apparatus, a protection circuit unit 27 for protecting the unit 26, and a power supply unit 28 having a voltage regulating IC 28a. The respective light receiving elements 8 and 12 are reversely connected with respect to each other and to the amplifying unit 21 which is designed so that when the respective quantities of light applied to the elements 8 and 21 are identical with each other, no output signal appears from the unit 21.

For instance, when it is desired that a mark printed on a wrapping sheet be detected by this photoelectric switching apparatus, firstly the adjusting knob 13 of FIG. 2 or 3 must be rotated so that the quantity of light rays applied to the reference light receiving element 12 becomes equal to that of light rays applied to the detecting light receiving element 8 from the lamp 2 via the plain surface of the sheet. Stated differently, the knob 13 is rotatably adjusted so that when the light rays from the lens 5 are focused on the plain surface of the wrapping sheet, no output signal is generated from the amplifying unit 21. If the switching apparatus detects the mark printed on the sheet, viz. the light rays from the lens 5 are focused on the mark, the quantity of light rays focused on the element 8 decreases or increases, so that the output from the unit 21 changes to a negative voltage or a positive voltage as the case may be.

Thus, when the output voltage of the unit 21 reaches the above-mentioned predetermined critical level, the Schmitt circuit unit 22 generates an output signal. The output signal from the unit 22 is applied to the output circuit unit 26 through inverter 23 and switch 25, and a detection output signal is outwardly generated from the unit 26 through a cable 19. If the switch unit 25 is switched to the other state, viz. from contact 25a to contact 25b, the detection output signal is inverted with respect to its polarity.

The protection circuit unit 27 is designed so that when an emitter current of an output transistor 26a flows over a predetermined point, a SCR 27a turns on so as to decrease a base current to transistor 26a. Thus, the unit 27 protects the unit 26.

As described hereinabove, according to this invention some of light rays projected from the light source enclosed in the photoelectric switching apparatus are guided to the reference light receiving element 12, and any change at the light source is evenly applied to both detection and reference light receiving elements 8 and 12, whereby detection output signals generated from the switching apparatus are not affected by any change at the light source. Moreover, both of said light receiving elements 8 and 12 are mounted on the same circuit board 17 in close mutual relationship, and any temperature change within the housing 1, such as a temperature rise due to heating of the light source with aging or a temperature change they may be caused by a change of external conditions of the apparatus, is evenly applied to the two light receiving elements 8 and 12, so that any such temperature changes that may be applied to the elements do not affect the output signals of this apparatus because the respective changes of the outputs of the light receiving elements 8 and 12 are offset in the subsequently connected circuit unit 21. Further, the detection and reference light receiving elements are mounted on the printed circuit board, and do not need any connection wires between the elements and its circuit board which are necessary, for instance, when the reference light receiving element is disposed adjacent to the light source. Since this switching apparatus does not need such connection wires which would be liable to receive an external noise, it is not only easy to assemble, but also is effective in noise protection.

It should be understood that the above description is merely illustrative of this invention and that many changes and modifications may be made by those skilled in the art without departing from the scope of the appended claims.

What is claimed is:

1. In a reflection-type photoelectric switching apparatus having a light projecting element for projecting light rays to an object, a detection light receiving photoelectric element for receiving reflected light rays from said object, a circuit device for processing output signals from said detection light receiving element, and a housing for enclosing at least said light projecting and detection light receiving elements and circuit device, the improvement comprising a reference light receiving photoelectric element disposed adjacent to said detection light receiving element, said reference light receiving element and said detection light receiving element being reversely connected with respect to each other such that the output of one of said elements cancels the output of the other of said elements, and a reference light path including conducting means for guiding some of said light rays projected from the light projecting element to said reference light receiving element, and means for adjusting a quantity of light rays guided by said reference light conducting means to a predetermined quantity whereby the resultant output of said reversely connected photoelectric elements can be adjusted to a desired quantity.

2. A reflection-type photoelectric switching apparatus according to claim 1, wherein said detection light receiving photoelectric element and said reference light receiving photoelectric element are mounted on a circuit board in side-by-side relation with respect to each other.

3. A reflection-type photoelectric switching apparatus according to claim 1, wherein said reference light conducting means is an optical fiber.

4. A reflection-type photoelectric switching apparatus according to claim 1, wherein said adjusting means includes a shading plate movable in the reference light path.

5. A reflection-type photoelectric switching apparatus according to claim 4, wherein said shading plate is movably connected to a screw rotatable by a knob, whereby rotation of said knob moves said shading plate in the reference light path.

6. A reflection-type photoelectric switching apparatus according to claim 1, wherein said adjusting means includes a knob externally disposed on said housing for easy access and adjustment.

* * * * *